US010793199B2

(12) United States Patent
Mika

(10) Patent No.: US 10,793,199 B2
(45) Date of Patent: Oct. 6, 2020

(54) VEHICLE SIDE PORTION STRUCTURE

(71) Applicant: TOYOTA JIDOSHA KABUSHIKI KAISHA, Toyota-shi, Aichi-ken (JP)

(72) Inventor: Takeshi Mika, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/178,754

(22) Filed: Nov. 2, 2018

(65) Prior Publication Data

US 2019/0161129 A1  May 30, 2019

(30) Foreign Application Priority Data

Nov. 29, 2017  (JP) ................. 2017-229378

(51) Int. Cl.
| | |
|---|---|
| B65D 27/00 | (2006.01) |
| B62D 27/02 | (2006.01) |
| B60R 16/02 | (2006.01) |
| B62D 21/15 | (2006.01) |
| B62D 25/04 | (2006.01) |
| B62D 25/20 | (2006.01) |

(52) U.S. Cl.
CPC ........ B62D 27/023 (2013.01); B60R 16/0215 (2013.01); B62D 21/157 (2013.01); B62D 25/04 (2013.01); B62D 25/2036 (2013.01)

(58) Field of Classification Search
CPC .... B62D 27/023; B62D 21/157; B62D 25/04; B62D 25/2036; B60R 16/0215
See application file for complete search history.

(56) References Cited

U.S. PATENT DOCUMENTS

| | | | |
|---|---|---|---|
| 7,237,833 B1* | 7/2007 | Moll ................. | B62D 25/087 |
| | | | 296/203.04 |
| 9,701,182 B1* | 7/2017 | Hallman .............. | B62D 21/157 |
| 9,969,435 B2* | 5/2018 | Johnson ............. | B62D 25/2036 |
| 2017/0203792 A1* | 7/2017 | Sunohara ........... | B62D 25/2036 |
| 2018/0244318 A1* | 8/2018 | Kiyoshita ............ | B62D 21/157 |

FOREIGN PATENT DOCUMENTS

| | | | | |
|---|---|---|---|---|
| CA | 2386494 A1 | * | 12/2002 | ........... B62D 25/087 |
| JP | 08175425 A | * | 7/1996 | |
| JP | 2000-280931 A | | 10/2000 | |
| JP | 2007153095 A | * | 6/2007 | |
| JP | 2011143761 A | * | 7/2011 | |
| WO | WO-2014155538 A1 | * | 10/2014 | ........... B62D 21/152 |

* cited by examiner

*Primary Examiner* — Lori L Lyjak
(74) *Attorney, Agent, or Firm* — Oliff PLC

(57) ABSTRACT

A vehicle side portion structure includes a cross member extended along a vehicle width direction, a pillar that extends along a vertical direction at an end, in a vehicle width direction, of a vehicle, and a gusset for connecting an end portion, in the vehicle width direction, of the cross member to the pillar. The gusset includes a plate portion whose inner end portion in the vehicle width direction is fastened to the cross member, the plate portion being extended from a region including a position fastened to the cross member toward a pillar side and having a region upwardly inclined toward outside in the vehicle width direction until the plate portion reaches in a region on the pillar side to a pillar side end, and a flange joined to the pillar side end of the plate portion and fastened to the pillar. A fastening position of the flange and the pillar is located upward of a fastening position of the inner end portion, in the vehicle width direction, of the gusset and the cross member.

2 Claims, 3 Drawing Sheets

VEHICLE SIDE PORTION STRUCTURE

CROSS REFERENCE TO RELATED APPLICATION

The disclosure of Japanese Patent Application No. 2017-229378 filed on Nov. 29, 2017, including specification, claims, drawings and abstract is incorporated herein by reference in its entirety.

TECHNICAL FIELD

The present disclosure relates to a vehicle side portion structure equipped with a cross member, a pillar, and a gusset.

BACKGROUND

JP 2000-280931 A discloses a structure in which a lower portion of a B pillar (a lock pillar) located on an end portion in a vehicle width direction of a vehicle is connected to an end portion of a rear seat cross member by means of a gusset. A space is defined below the gusset between the end portion of the rear seat cross member and the B pillar.

It has been considered that a wire harness extending along a vehicle longitudinal direction may be placed in a space between a lower portion of a B pillar and an end portion of a cross member fixed onto an upper face of a floor panel of a vehicle so as to be extended along the vehicle width direction. However, in such a case of placing the wire harness within the space, there is a possibility that the wire harness will be caught and crushed between the B pillar and the floor panel if the B pillar topples down toward an inner region of the vehicle when the vehicle collides on its side. In the structure disclosed in JP 2000-280931 A, it is possible that the wire harness is placed in the space defined by the gusset, the end portion of the cross member, and the lower portion of the B pillar. In this structure, however, a plate portion arranged in an upper end region of the gusset extends along a horizontal direction from a position at which the plate portion is fixed to the cross member toward outside in the vehicle width direction to a location where the plate portion makes contact with the B pillar, and a flange formed on the contact location is fastened to the B pillar. Such a structure is susceptible to improvement in that the B pillar should be prevented from becoming toppled. Although there is an alternative arrangement where the wire harness is placed in a space between a lower portion of a C pillar and the cross member rather than in the space between the B pillar and the cross member, this arrangement may have a disadvantage associated with crushing of the wire harness as described above.

An object of the present disclosure is to suppress crushing of a wire harness upon the occurrence of a side collision of a vehicle when the wire harness is placed in a space between a lower portion of a pillar and an end portion of a cross member.

SUMMARY

In an aspect, a vehicle side portion structure of this disclosure includes a cross member fixed onto an upper side of a floor panel of a vehicle so as to extend along a vehicle width direction, a pillar extended along a vertical direction at an end portion, in the vehicle width direction, of the vehicle, and a gusset for connecting an end portion in the vehicle width direction of the cross member to the pillar, in which the gusset includes a plate portion whose inner end portion in the vehicle width direction is fastened to the cross member, the plate portion being extended from a region including a position fastened to the cross member toward a pillar side, and having a portion upwardly inclined toward outside in the vehicle width direction at least until a region on the pillar side of the plate portion reaches a pillar side end, the gusset further including a flange joined to the pillar side end of the plate portion and fastened to the pillar. Further, in the vehicle side portion structure, a position at which the flange is fastened to the pillar is located upward of a position at which the inner end portion, in the vehicle width direction, of the gusset is fastened to the cross member.

According to the above-described structure, the pillar which is toppling toward a vehicle inner region upon the occurrence of a side collision of the vehicle can be received by the gusset at a region that is further up, which can facilitate quick and effective transfer of a load exerted from the pillar along the vehicle width direction to the cross member. In this way, because toppling of the pillar can be suppressed, crushing of a wire harness that is placed in a space between a lower portion of the pillar and an end portion of the cross member can be suppressed at the time of a side collision.

In another aspect, the vehicle side portion structure of this disclosure may further include a bracket that is fixed onto an upper portion of the end portion in the vehicle width direction of the cross member, and that has a wall surface defined to face outside in the vehicle width direction, the wall surface being opposed at a distance to an inner end in the vehicle width direction of the gusset.

According to the above-described structure, when arrangement of fastening the gusset to the cross member is broken at the time of a side collision of the vehicle, the gusset, which moves toward the inside in the vehicle width direction, is brought into contact with the bracket, and is accordingly hindered from moving further. This can prevent the pillar from further toppling, and can, in turn, prevent crushing of the wire harness upon the occurrence of the side collision even through the wire harness is placed in the space between the lower portion of the pillar and the end portion of the cross member.

According to the vehicle side portion structure of the present disclosure, it becomes possible to suppress crushing of the wire harness, which is placed in the space between the lower portion of the pillar and the end portion of the cross member, at the time of a side collision.

BRIEF DESCRIPTION OF DRAWINGS

An embodiment of the present disclosure will be described with reference to the following figures, wherein.

DESCRIPTION OF EMBODIMENT

Hereinafter, an embodiment of the present disclosure will be described with reference to the drawings. Shapes, materials, and the number of components described below are indicated by way of illustration, and may be changed as appropriate in accordance with specifications of a vehicle, including a vehicle side portion structure. The same components are identified by the same reference signs in all of the drawings. In addition, previously indicated reference signs are used as needed for explanation in subsequent description.

Figure 1:
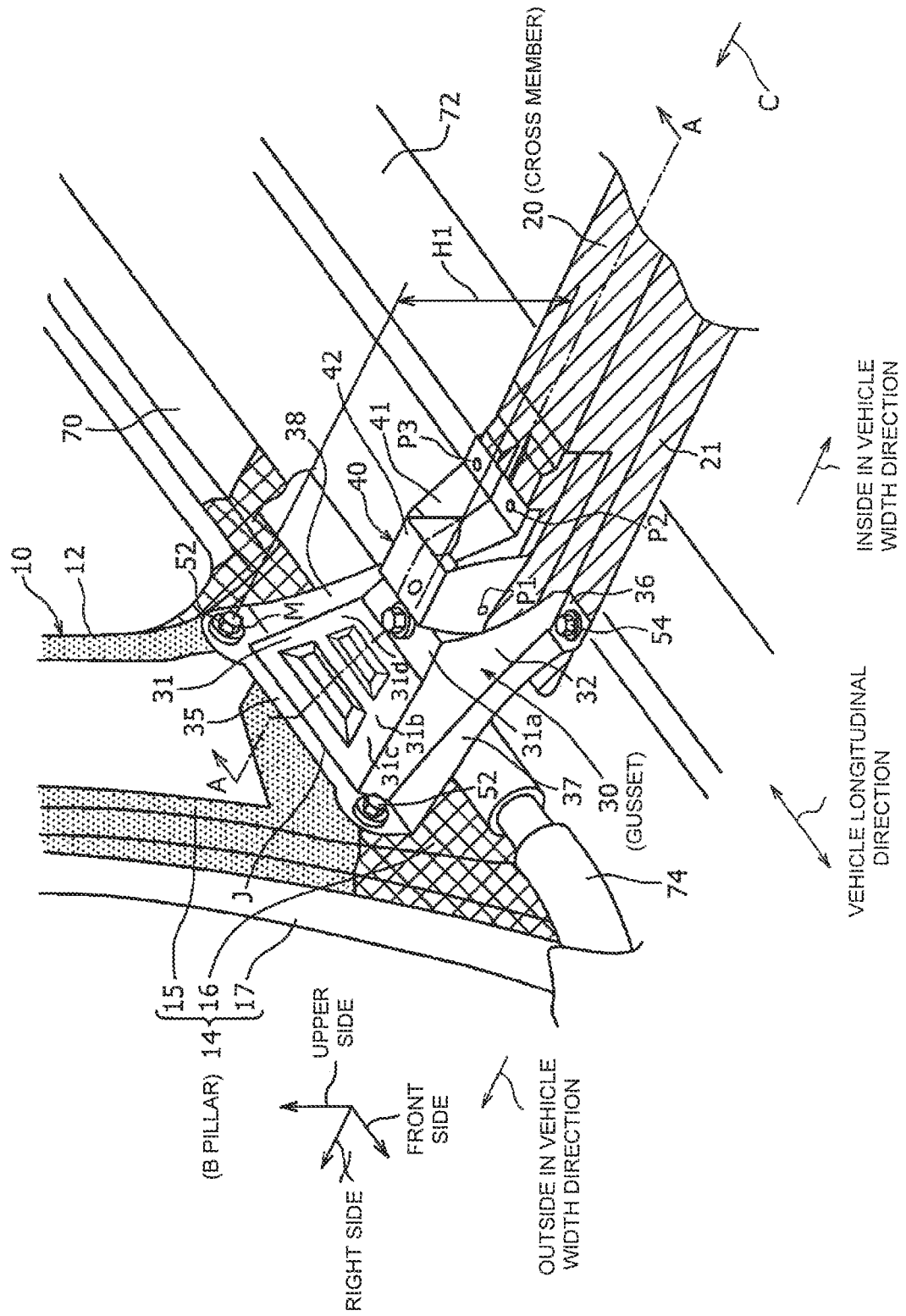
FIG. 1 shows a perspective view of a vehicle side portion structure according to an embodiment of the present disclosure.
Figure 2A:
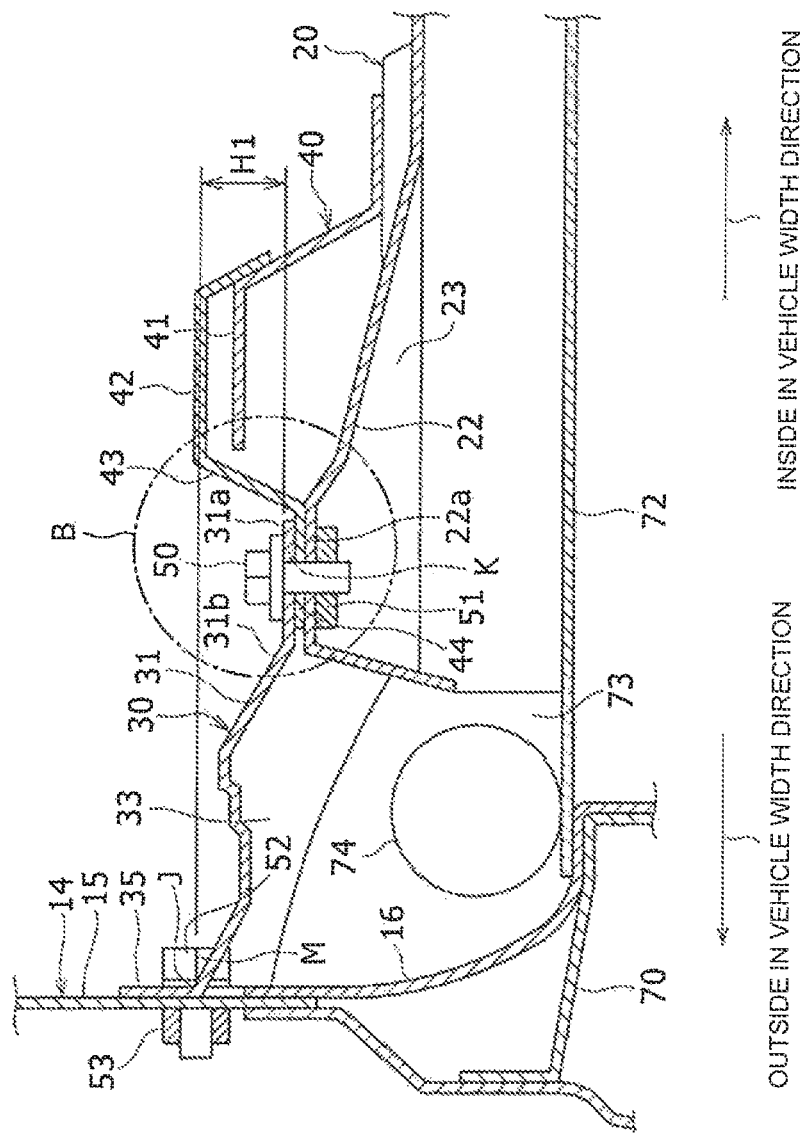
FIG. 2A is a cross sectional view taken along line A-A indicated in FIG. 1.
Figure 2B:
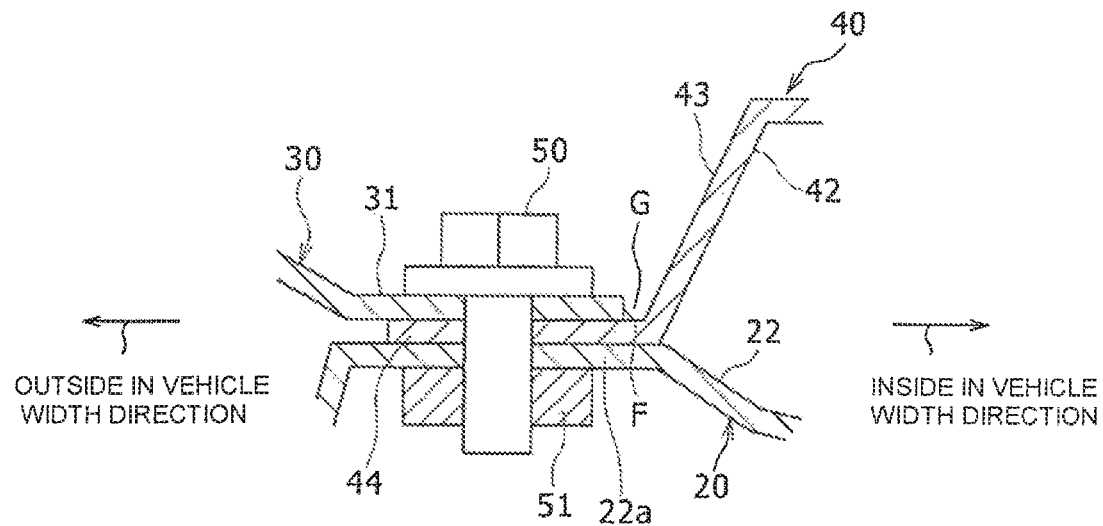
FIG. 2B is an enlarged view of region B indicated in FIG. 2A.
Figure 3:
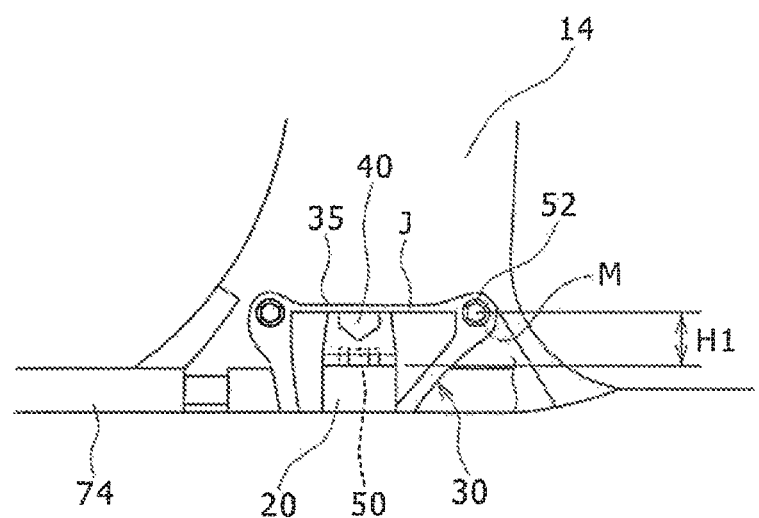
FIG. 3 is a diagram viewed along an arrow C indicated in FIG. 1.

FIG. 1 is a perspective view of a vehicle side portion structure 12 according to an embodiment. FIG. 2A is a cross sectional view taken along line A-A indicated in FIG. 1, and FIG. 2B is an enlarged view of region B indicated in FIG. 2A. FIG. 3 is a diagram viewed along an arrow C indicated in FIG. 1.

The vehicle side portion structure 12 in this embodiment is applied to a vehicle of a four-door type or a five-door type. A vehicle body 10 constituting a part of the vehicle includes a B pillar 14 disposed on an end portion in a vehicle width direction of the vehicle between a front door (not illustrated) and a rear door (not illustrated) so as to be extended along a vertical direction. Further, the vehicle body 10 includes a C pillar (not illustrated) disposed on the end portion in the vehicle width direction at a rear side of the B pillar 14 between the rear door and the vehicle body 10 so as to be extended along the vertical direction. Upper ends of the B pillar 14 and the C pillar are joined to a ceiling panel (not illustrated). The B pillar 14 is composed of a first pillar component 15 which is arranged on an inner side of the vehicle width direction, a second pillar component 16 which is secured to a lower end portion of the first pillar component 15, and a third pillar component 17 which is disposed on an outer side in the vehicle width direction and secured to both the first pillar component 15 and the second pillar component 16. In FIG. 1, the first pillar component 15 is shown with dot shading, and the second pillar component 16 is shown with inclined lattice lines.

A lower end portion of the B pillar 14 is secured to an upper end portion of the locker 70. The locker 70 is a substantially cylindrical portion which has a closed shape in cross section, and is disposed on an end portion in the vehicle width direction of the vehicle body 10 and extended along a vehicle longitudinal direction. An end portion, in the vehicle width direction, of a floor panel 72 is fixed to an upper surface of the locker 70.

The vehicle side portion structure 12 is composed of the B pillar 14, a cross member 20, a gusset 30, and a seat bracket 40. The cross member 20 is fixed onto an upper portion of a middle portion in a front-and-rear direction of the floor panel 72 so as to be extended along the vehicle width direction. The cross member 20 includes a flange 21, which is disposed on both front and rear ends of a lower end portion of the cross member 20, and has the shape of a hat in cross section cut along a plane orthogonal to the vehicle width direction. In FIG. 1, the cross member 20 is shown by a hatched area.

As shown in FIGS. 2A and 2B, a ridged portion 22 protruded upward is formed on an upper surface in an outer end portion in the vehicle width direction of the cross member 20. Wall portions 23 formed on both front and rear sides of the cross member 20 are protruded in their respective outer end portions in the vehicle width direction so as to have a ridged shape that conforms to the contour of the ridged portion 22. A crest region 22a of the ridged portion 22 is arranged parallel to a horizontal surface. The gusset 30, which will be described below, is joined to the crest region 22a.

The gusset 30 is composed of a metal plate which is formed substantially in the shape of a hat in cross section, and includes an upper end plate portion 31 arranged on an upper end and extended substantially along the vehicle width direction, a front side plate portion 32, a rear side plate portion 33, and an upper end flange 35. The front side plate portion 32 is joined to a front end of the upper end plate portion 31 and has a triangular shape which extends downward in such a manner that an inner end portion in the vehicle width direction of the front side plate portion 32 is located further inward in the vehicle width direction from an inner end in the vehicle width direction of the upper end plate portion 31 and protrudes obliquely downward. The rear side plate portion 33 is joined to a rear end of the upper end plate portion 31 and has a triangular shape which extends downward in such a manner that an inner end portion in the vehicle width direction of the rear side plate portion 33 is located further inward in the vehicle width direction from the inner end in the vehicle width direction of the upper end plate portion 31 and protrudes obliquely downward.

An inner end portion in the vehicle width direction of the upper end plate portion 31 is fastened to the cross member 20. Specifically, the upper end plate portion 31 includes a first portion 31a, which is formed parallel to the horizontal surface in an inner end portion in the vehicle width direction of the upper end plate portion 31, and a second portion 31b, which is joined to an outer end in the vehicle width direction of the first portion 31a and is, in general, upwardly inclined toward the outside in the vehicle width direction.

As will be described below, the cross member 20 is fastened to the first portion 31a of the gusset 30 by means of a bolt 50 penetrating through the first region 31a along the vertical direction, and a nut 51. As a result, the upper end plate portion 31 of the gusset 30 extends from a region including a position fastened to the cross member 20 toward the B pillar 14. Meanwhile, the second portion 31b includes inclined portions 31c and 31d which are disposed on both front and rear end portions in a region including a B pillar 14 side of the gusset 30, and upwardly inclined toward the outside in the vehicle width direction until reaching a B pillar 14 side end. A recessed portion and a projected portion arranged side by side in the vehicle width direction are defined on an upper surface of a middle portion in the front-and-rear direction of the second region 31b, for the purpose of increasing surface stiffness of the second portion 31b.

The upper end flange 35 of the gusset 30 is joined to the B pillar 14 side end of the upper end plate portion 31. At least both front and rear end portions of the upper end flange 35 are formed so as to conform to an inner surface, in the vehicle width direction, of the B pillar 14. The upper end flange 35 is fastened to the B pillar 14 by means of bolts 52 penetrating through the both front and rear end portions along the vehicle width direction, and nuts 53. It is preferable that front and rear fastening positions of the upper end flange 35 be located at substantially the same position in the vertical direction, in terms of reception of a load transferred from the B pillar 14 to the gusset 30 with good balance at the time of a side collision, which will be described below. The nuts 53 may be weld nuts welded to the B pillar 14.

Fastening flanges 36 extended along the vehicle front-and-rear direction are formed to lower end portions on inner end portions, in the vehicle width direction, of the front side and rear side plate portions 32 and 33 of the gusset 30. The fastening flanges 36 are fastened to both the flange 21 of the cross member 20 and the floor panel 72 by means of bolts 54 and nuts (not illustrated).

In the front side and rear side plate portions 32 and 33, their lower end edges other than a region where the fastening flanges 36 are formed are downwardly inclined toward the inside in the vehicle width direction. In this way, a space 73 (FIG. 2A) is defined between the floor panel 72 and the lower end edges of the front side and rear side plate portions 32 and 33, and a wire harness 74, which will be described below, is placed in the space 73.

The lower end portion of the front side plate portion 32 is joined to a front flange 37 extending forward. The lower end portion of the rear side plate portion 33 is joined to a rear flange 38 extending rearward.

A front end portion of the upper end flange 35 protrudes forward from a front end of the upper end plate portion 31, and a lower end of the front end portion of the upper end flange 35 is joined to an outer end, in the vehicle width direction, of the front flange 37. Further, an inner end, in the vehicle width direction, of the front flange 37 is joined to an outer end, in the vehicle width direction, of the fastening flange 36 located on the front side. A rear end portion of the upper end flange 35 protrudes rearward from a rear end of the upper end plate portion 31, and a lower end of the rear end portion of the upper end flange 35 is joined to an outer end, in the vehicle width direction, of the rear flange 38. Further, an inner end, in the vehicle width direction, of the rear flange 38 is joined to an outer end, in the vehicle width direction, of the fastening flange 36 (not illustrated) located on the rear side.

The seat bracket 40 has a box shape which is substantially trapezoidal in cross section, and is designed as a seat support bracket for supporting a seat (not illustrated) on which a vehicle occupant sits. The seat bracket 40 is fixed onto an upper portion of an outer end portion, in the vehicle width direction, of the cross member 20 by welding. The seat bracket 40 is structured in such a manner that an upper component 42 formed of a metal plate is placed on an upper region of a lower component 41 formed of a metal plate so as to have a region overlapped with the upper region of the lower component 41, and the overlapped regions are welded to join the upper component 42 and the lower component 41. The seat bracket 40 includes, at an outer end in the vehicle width direction of the upper component 42, an outer wall surface 43 facing the outside in the vehicle width direction and also includes an outwardly protruded plate portion 44 (FIG. 2B) protruded outward in the vehicle width direction from the outer wall surface 43. As shown in FIG. 2B, the outer wall surface 43 is an inclined surface which is downwardly inclined toward the outside in the vehicle width direction. The outwardly protruded plate portion 44 extends along the horizontal direction so as to be overlaid on the crest region 22a of the cross member 20, and is secured to the crest region 22a at positions α circled by broken lines shown in FIG. 1 by means of welding.

An inner end portion in the vehicle width direction and both front and rear end portions of the seat bracket 40 are secured, for example, at positions P1 to P3 shown in FIG. 1, to the outer end portion, in the vehicle width direction, of the cross member 20 by welding.

Then, the first region 31a of the gusset 30 is placed on the outwardly protruded plate portion 44 of the seat bracket 40 and fastened to the cross member 20 by means of the bolt 50 and the nut 51 at a position that is different from positions at which the outwardly protruded plate portion 44 is welded to the cross member 20. For the fastening, the bolt 50 is inserted through the first region 31a, the outwardly protruded plate portion 44, and the crest region 22a of the cross member 20 along the vertical direction. The nut 51 may be a weld nut welded to a bottom side of the crest region 22a of the cross member 20. In this way, the cross member 20 is secured to the upper end portion of an inner end region, in the width direction, of the gusset 30. As a result, the gusset 30 connects the end portion in the vehicle width direction of the cross member 20 to the B pillar 14. In this state, the outer wall surface 43 of the seat bracket 40 faces an inner end F (FIG. 2B) in the vehicle width direction of the first region 31a of the gusset 30 over a gap G (FIG. 2B).

Further, as shown in FIGS. 1 and 2A, a joint portion J of the upper end plate portion 31 of the gusset 30 and the upper end flange 35 is located, upward of a fastening position K at which the upper end plate portion 31 of the gusset 30 is fastened to the cross member 20 (FIG. 2A), at a distance H1 from the position K. In addition, a fastening position M at which the upper end flange 35 is fastened to the B pillar 14 is located upward of the fastening position K at which the inner end portion, in the vehicle width direction, of the upper end plate portion 31 of the gusset 30 is fastened to the cross member 20. The fastening position M of the upper end flange 35 and the B pillar 14, and the joint portion J, are located at substantially the same position in the vertical direction.

Further, as shown in FIGS. 1 and 2A, the wire harness 74 is placed so as to be extended along the front-and-rear direction in a space between the lower portion of the B pillar 14 and the end portion of the cross member 20. The wire harness 74 connects, for example, an electrical component, such as an inverter, located on the vehicle front side and an electrical component, such as a battery, located on the vehicle rear side.

It should be noted that although FIGS. 1 to 3 show the structure of an end portion on the right side of the vehicle, the structure of the end portion on the left side of the vehicle is identical to that on the right side, other than right and left sides being reversed. Meanwhile, there may be a case where the wire harness 74 is only arranged in the end portion either on the right side or the left side of the vehicle. In this case, the cross member 20 may be connected to the B pillar 14 by the gusset 30 only on the end portion in which the wire harness 74 is arranged.

According to the above-described vehicle side portion structure 12, the upper end plate portion 31 of the gusset 30 includes the inclined portions 31c and 31d which are upwardly inclined toward the outside in the vehicle width direction until the second region 31b on the B pillar 14 side reaches the B pillar 14 side end. Further, the fastening position at which the upper end flange 35 joined to the upper end plate portion 31 is fastened to the B pillar 14 is located upward of the position at which the inner end portion, in the vehicle width direction, of the gusset 30 is fastened to the cross member 20. This allows the B pillar 14 that is toppling toward the inside of the vehicle when the vehicle collides on its side to be received by the gusset 30 at a region that is further up. In addition to this, the load in the vehicle width direction can be transferred from the B pillar 14 to the cross member 20 in a speedy and effective way. In this way, toppling of the 13 pillar 14 can be suppressed, to thereby suppress crushing of the wire harness 74 placed in the space between the lower portion of the B pillar 14 and the end portion of the cross member 20 at the time of a side collision. As a result, leakage of electric current from the wire harness 74 can be prevented.

It should be noted that a middle portion in the front-and-rear direction of the upper end flange 35 may be spaced apart from an inner surface, in the vehicle width direction, of the B pillar 14. In this case, when the load is exerted at the time of the side collision from the B pillar 14 to the fastening position of the B pillar 14 and the upper end flange 35, the upper end flange 35 is pushed to the inside along the vehicle width direction, which causes a force to be applied from the middle portion in the front-and-rear direction of the upper end flange 35 to the outer ends in the vehicle width direction of the inclined portions 31c and 31d. This can facilitate speedy and effective transfer of the load in the vehicle width direction from the B pillar 14 to the cross member 20.

On the other hand, in a structure described in JP 2000-280931 A, an outer end portion in the vehicle width direction of a cross member is joined to a B pillar by a gusset. However, a plate portion located at an upper end of the gusset is horizontally extended toward the B pillar, and a flange formed at a B pillar side end of the plate portion is fastened to the B pillar. In such a structure, the force applied to the B pillar at the time of a side collision is received at a lower position by the gusset, which is susceptible to improvement in terms of prevention of toppling of the B pillar at the time of the side collision of the vehicle. This point can be improved according to the above-described embodiment.

Further, the vehicle side portion structure 12 of this embodiment includes the seat bracket 40 which is fixed onto the upper portion of the outer end portion, in the vehicle width direction, of the cross member 20, and is equipped with the outer wall surface 43 facing the outside in the vehicle width direction. The outer wall surface 43 is opposed at a distance to the inner end, in the vehicle width direction, of the gusset 30. In this way, when the gusset 30 is moved toward the inside in the vehicle width direction due to breakage of the arrangement for fastening the gusset 30 to the cross member 20 at the time of a side collision of the vehicle, the gusset 30 is brought into contact with the seat bracket 40, which can hamper further movement of the gusset 30. As a result, the toppling of the B pillar 14 can be suppressed, to thereby suppress crushing of the wire harness 74 placed in the space between the lower portion of the B pillar 14 and the end portion of the cross member 20 at the time of the side collision. It should be noted that the outer wall surface 43 of the seat bracket 40 is not limited to the inclined surface that is downwardly inclined toward the outside in the vehicle width direction, and may be formed in the shape of a plane orthogonal to the vehicle width direction. The bracket that is opposed to the inner end in the vehicle width direction of the gusset 30 may be any bracket other than the seat bracket 40.

The above embodiment illustrated in FIGS. 1 to 3 has been described with reference to the wire harness 74 that is placed in the space between the lower portion of the B pillar 14 and the cross member 20. However, the embodiment may be applied to an arrangement in which a wire harness is placed in a space between a lower portion of a C pillar and a cross member.

Further, in the above embodiment illustrated in FIGS. 1 to 3, it has been descried that the upper end plate portion 31 of the gusset 30 includes the first portion 31a which is parallel to the horizontal surface and the second portion 31b which is generally inclined from the horizontal surface. Meanwhile, the upper end plate portion of the gusset may be formed in a shape that is upwardly inclined, in the entire vehicle width direction, toward the outside in the vehicle width direction. Then, the crest region of the cross member on which the upper end plate portion is overlaid may be an inclined surface that is upwardly inclined toward the outside in the vehicle width direction, and the upper end plate portion may be fastened to such an inclined crest region by means of a bolt and a nut.

The invention claimed is:

1. A vehicle side portion structure, comprising:
   a cross member that is fixed onto an upper side of a floor panel in a vehicle so as to extend along a vehicle width direction;
   a pillar that extends along a vertical direction at an end portion in the vehicle width direction of the vehicle; and
   a gusset that connects an end portion in the vehicle width direction of the cross member to the pillar, wherein
   the gusset includes a plate portion whose inner end portion in the vehicle width direction is fastened to the cross member, the plate portion being extended from a region including a position fastened to the cross member toward a pillar side, and having a portion upwardly inclined toward outside in the vehicle width direction at least until the plate portion reaches in a region on the pillar side to a pillar side end, the gusset further including a flange which is joined to the pillar side end of the plate portion and fastened to the pillar, and
   a position at which the flange is fastened to the pillar is located upward of a position at which the inner end portion in the vehicle width direction of the gusset is fastened to the cross member.

2. The vehicle side portion structure according to claim 1, further comprising:
   a bracket that is fixed onto an upper portion of the end portion in the vehicle direction of the cross member, and that has a wall surface defined to face outside in the vehicle width direction, the wall surface being opposed at a distance to the inner end portion in the vehicle width direction of the gusset.

* * * * *